United States Patent
Famor

(10) Patent No.: US 10,824,184 B1
(45) Date of Patent: Nov. 3, 2020

(54) FAMOR EXTENSION BRAKE

(71) Applicant: Allan Rubia Famor, Vallejo, CA (US)

(72) Inventor: Allan Rubia Famor, Vallejo, CA (US)

( * ) Notice: Subject to any disclaimer, the term of this patent is extended or adjusted under 35 U.S.C. 154(b) by 0 days.

(21) Appl. No.: 14/545,668

(22) Filed: Jun. 3, 2015

Related U.S. Application Data

(60) Provisional application No. 61/997,770, filed on Jun. 9, 2014.

(51) Int. Cl.
| | |
|---|---|
| *G05G 1/487* | (2008.04) |
| *B60T 7/06* | (2006.01) |
| *G05G 5/12* | (2006.01) |
| *B62B 9/08* | (2006.01) |

(52) U.S. Cl.
CPC ............. *G05G 1/487* (2013.01); *B60T 7/06* (2013.01); *G05G 5/12* (2013.01); *B62B 9/08* (2013.01)

(58) Field of Classification Search
CPC .. G05G 1/487; G05G 5/06; B60T 7/06; B60T 7/047
See application file for complete search history.

(56) References Cited

U.S. PATENT DOCUMENTS

| | | | | |
|---|---|---|---|---|
| 2,481,966 A | * | 9/1949 | Zivi ...................... | B60W 30/18 74/481 |
| 2,759,370 A | * | 8/1956 | Frates .................... | G05G 1/487 74/526 |
| 4,424,723 A | * | 1/1984 | Gockel ................. | B60W 30/18 403/100 |
| 5,129,492 A | * | 7/1992 | Lenz ........................ | B60T 7/08 477/27 |

* cited by examiner

*Primary Examiner* — Vicky A Johnson

(57) ABSTRACT

I was training my teen student driver on the road when I came up with this brilliant yet innovative idea. It is very hard to control the vehicle by just merely yelling "BRAKE" to the student driver. It is unfair to other motorists the risk they are unknowingly taking without an absolute control of the vehicle of a professional driver who is just sitting on the passenger side. In view of this unsafe training condition, I designed and fabricated a Famor Extension Brake. It is a mechanical device that is easily installed on any motor vehicle without modifications. Using this device, the passenger can independently apply the brake to the vehicle when the driver fails to do so. These can be a student, old or destructed drivers.

4 Claims, 4 Drawing Sheets

FAMOR EXTENSION BRAKE

BACKGROUND OF THE INVENTION

1. Field of the Invention

The invention is about applying a brake of any motor vehicle by the passenger and not by the driver. There are times that the driver is unable to apply the brake when needed such as student, old, distracted, or stunt drivers, etc. . . . .

2. Prior Invention

There are similar inventions to this extension brake but it needs a professional installer. It requires drilling and modification to the car which my invention does not require one.

SUMMARY OF THE INVENTION

The underlying objective of the present invention is to improve the road safety conditions even the presence of student, old or destructed drivers. Famor Extension Brake is very easy to install that does not need any type of drilling and modifications to the vehicle.

DETAILED DESCRIPTION OF THE PREPARED EMBODIMENTS

Figure 1:
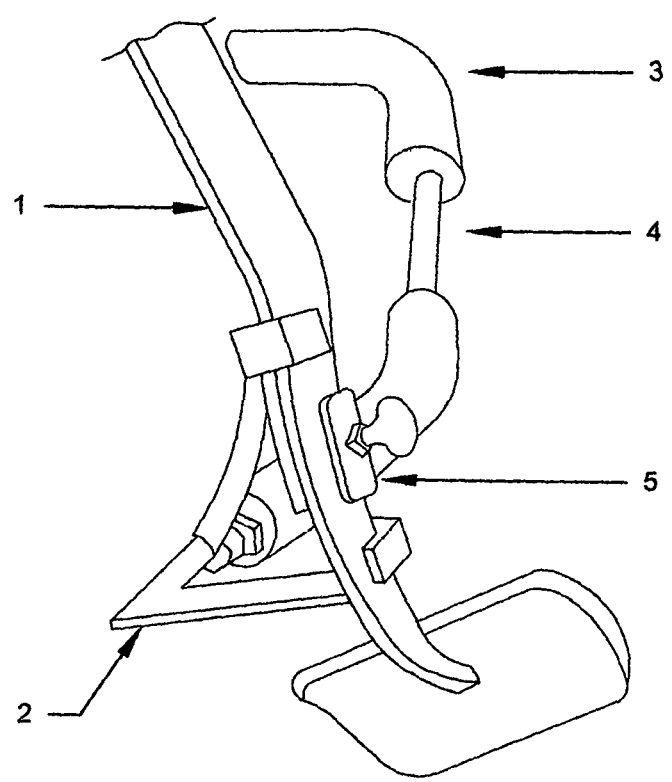
FIG. 1 is a schematic view of a Famor Extension Brake installed to a typical brake arm of a motor vehicle showing 6 embodiments.
Figure 2:
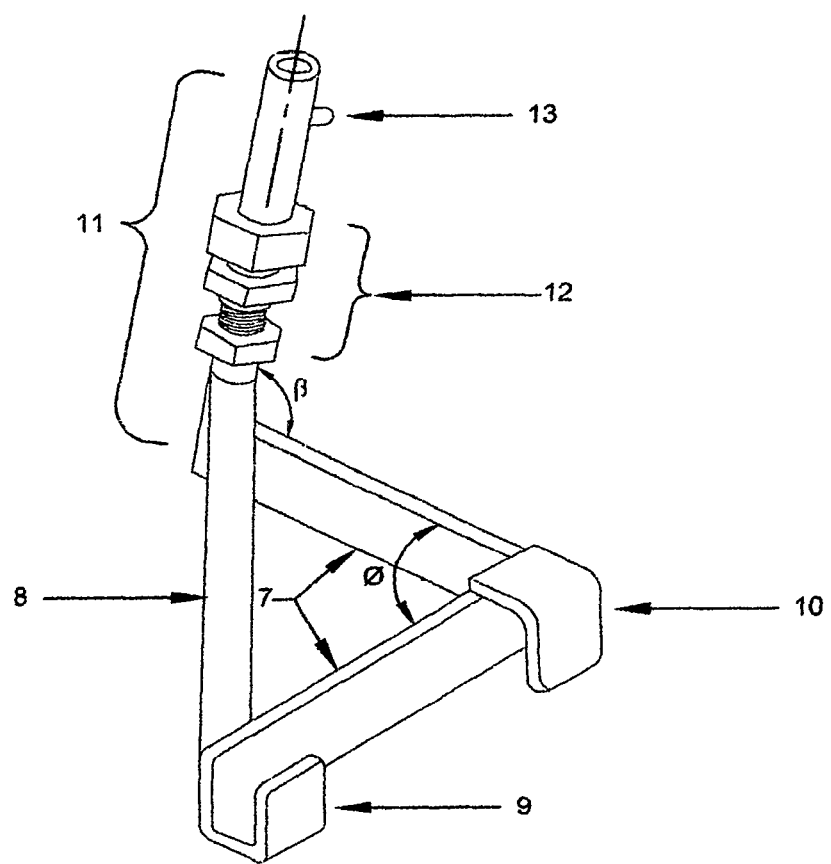
FIG. 2 is an isometric drawing of a Moment Adaptor showing 9 embodiments.

FIG. 1 shows an extension brake installed to a typical brake arm 1, of a motor vehicle. The Moment Adaptor 2, is attached to 1 by a Clamp 5. The Handle 4, which is wrapped by a pipe insulation 3, is attached to the receiving Post 11, as shown in FIG. 2. The purpose of 3 on the handle is just for smooth handling.

FIG. 2 shows a Moment Adaptor showing 9 embodiments. The L-shaped chassis 7, Bracket 8, the opposing hooks 9 ("u"-shape) and 10 ("n"-shape) hooks, the receiving Post 11, the brass compression type reducer 12, the single end snap button 13.

The opposing direction of hooks 9 and 10 is the main heart of the Moment Adaptor. It converts the applied force at the end of the receiving Post 11, by the handle as shows in FIG. 3, to the Moment Arm, thereby effecting a push on the brake without stepping on the brake pedal.

The receiving Post 11, has two moveable parts, which is the brass compression type reducer 12, and the single end snap button 13. The reducer 12, will fasten the handle to the Post 11 and the single end snap button 13 is a guide for the handle so that it is in right bend orientation.

Figure 3:
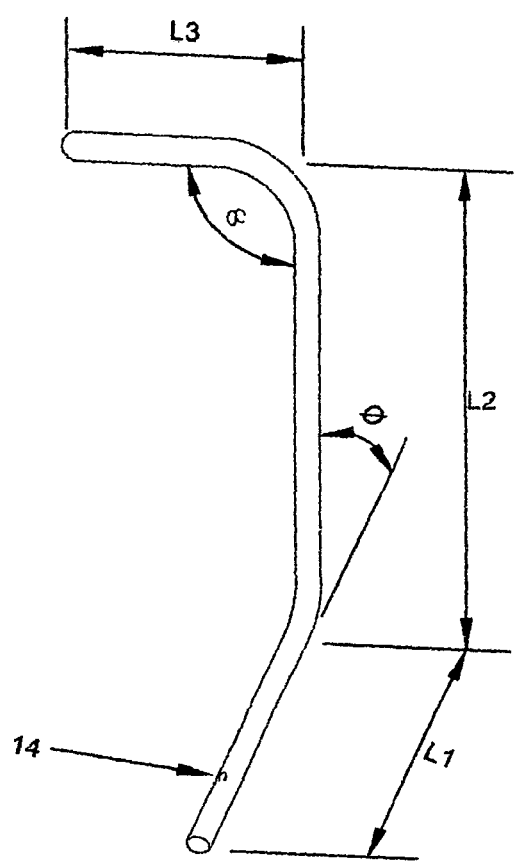
FIG. 3 is an isometric drawing of a typical Handle showing 6 embodiments.

FIG. 3 shows a typical Handle with bends $\phi$ and $\alpha$, pre-drilled hole 14 and lengths L1, L2, and L3. These parameters are unique to every car, make and model.

The Handle is inserted to the receiving Post 11 until it reaches to the reducer 12. It is then rotated until such orientation that the single end snap button 13 will click and shoot through the pre-drilled hole 14. When the button is inside the pre-drilled 14, then the reducer 12, is tightened to fasten the Handle. The Handle bend $\phi$ and $\alpha$ is unique for every car, make and model. This is to avoid the nearest obstacles such as the dashboard and gear shifter when applying a downward force on the extension brake.

Figure 4:
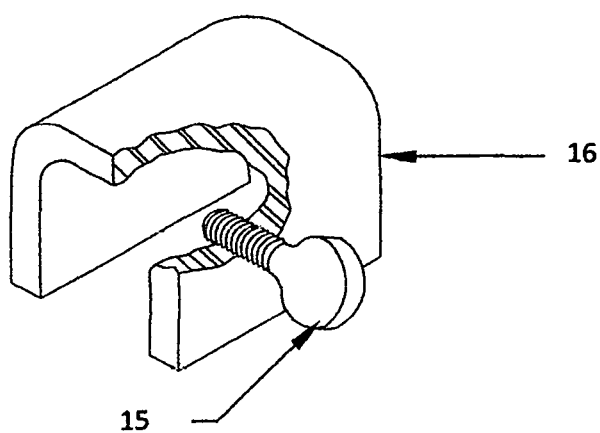
FIG. 4 is an exploded view of a Clamp showing 2 embodiments.

FIG. 4 shows the exploded view of a Clamp showing thump screw 15 and the shell 16. This is the step to be done when the Moment Adaptor and Handle are in place. Clamp will fasten the Moment Adaptor to the brake arm as shown in FIG. 1

While the present invention has been described in connection with what is considered the most practical and preferred embodiment, it is understood that this invention is not limited to the disclosed embodiment, but it is intended to cover various set-up that is within the realms and scope of the broadest interpretation so as to encompass all such modification and equivalent arrangements.

I claim:

1. The Famor Extension Brake (FEB) is hand control device as an alternative way for applying brake of a motor vehicle, where the vehicle has a brake pedal, said FEB comprising: a moment arm is connected to the brake arm; a handle made of lightweight aluminum tube bent to two separate obtuse angles; a clamp is a fastener for the moment arm be attached to the brake arm, wherein the moment arm has two parts, namely; a receiving post and opposing hooks, wherein the opposing hooks of the moment arm serve as the connection to the brake pedal.

2. The FEB on claim 1, wherein the receiving post of the moment arm is the receiving snap button of the handle and a locking nut to provide the locking of the handle in a fixed position to the moment arm.

3. The FEB of claim 1, wherein the clamp has a wing-nut that is fastened against the brake arm to effect fastening of the moment arm towards the brake arm.

4. The FEB of claim 3, wherein the handle has a foam padding at the end of its length for comfort in handling.

* * * * *